Figure 1:
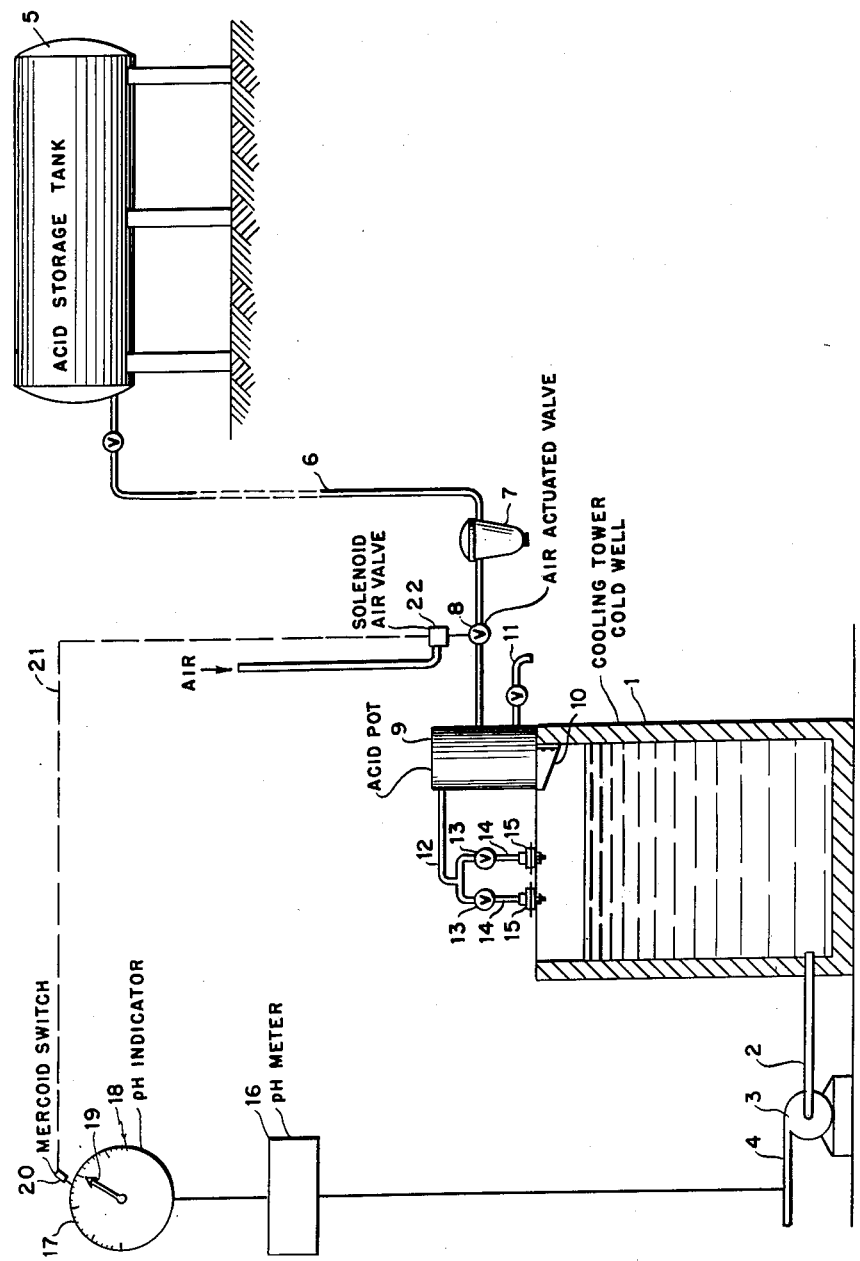

Dec. 4, 1956  D. E. NORRIS  2,772,779
METHOD FOR pH CONTROL IN CIRCULATING WATER
Filed Jan. 29, 1952  2 Sheets-Sheet 1

INVENTOR.
Donald E. Norris
BY
Adams, Forward and McLean
ATTORNEYS

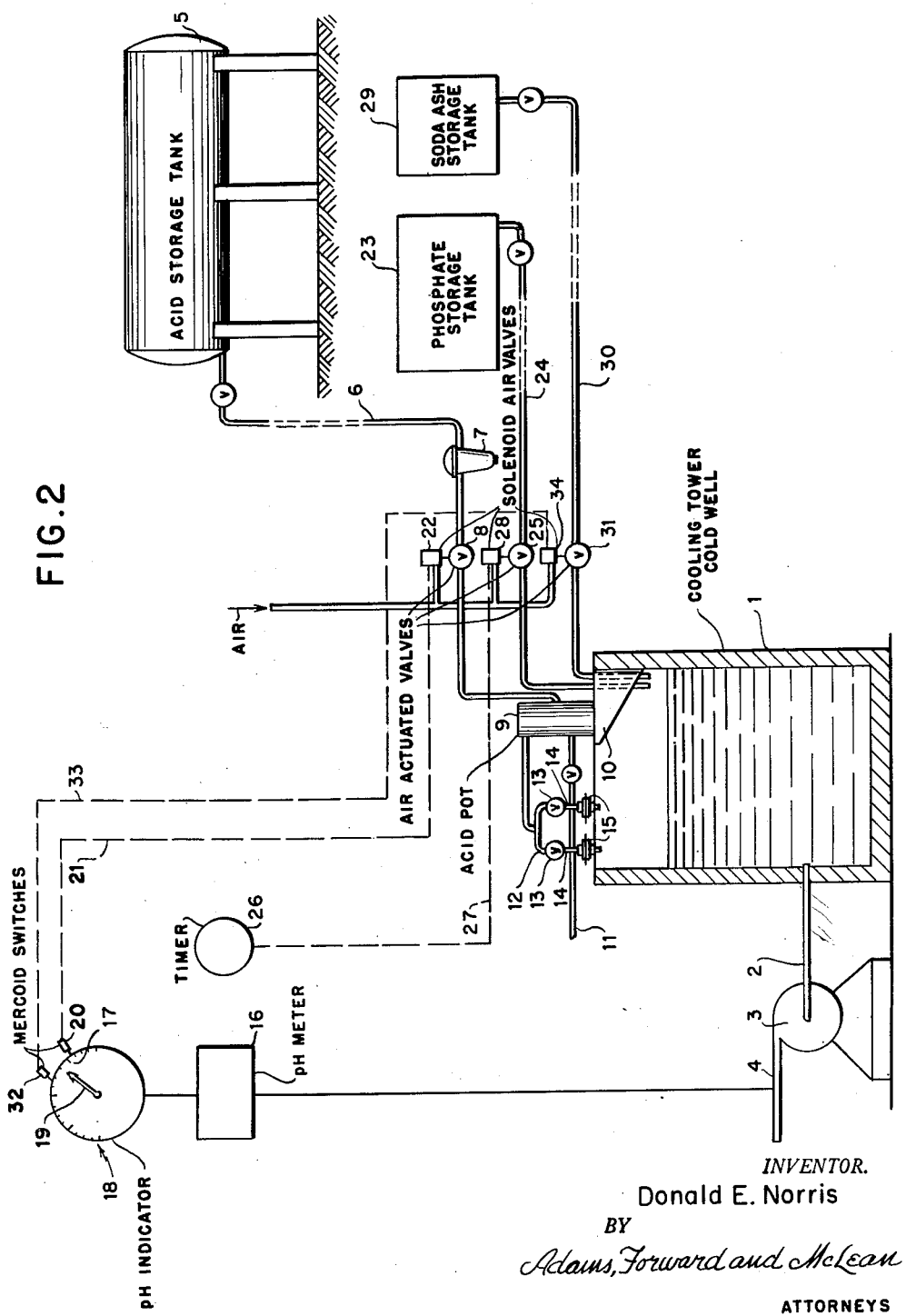

United States Patent Office 2,772,779
Patented Dec. 4, 1956

2,772,779

METHOD FOR pH CONTROL IN CIRCULATING WATER

Donald E. Norris, Hammond, Ind., assignor to Sinclair Refining Company, New York, N. Y., a corporation of Maine Application January 29, 1952, Serial No. 268,862

2 Claims. (Cl. 210—29)

My invention relates to the control of hydrogen ion concentration in circulating cooling water systems which contain polyphosphate corrosion inhibitors. In particular, my invention is a method specifically designed for the control of pH value of continuously circulating cooling water in natural and forced draft cooling towers in which polyphosphate corrosion inhibitors are employed.

The successful employment of the polyphosphates in the treatment of cooling tower water requires very exact control of the pH values of that water. The more common method of adjusting the pH is by the addition of acid to the water system, usually at the cold well of the cooling tower, but it is extremely difficult to add exactly the required volume of acid and maintain uniform control of pH throughout the circulating system.

I have discovered a method which provides trouble-free, reliable and positive pH control in cooling tower water systems employing polyphosphate corrosion inhibitors. My invention contemplates the continuous measurement of the pH value of the cooling water. Aqueous acid solution is introduced to the continuously circulating water stream at a regulated rate at a point upstream from the point at which the pH is measured. The acid introduction is made in a repeated cycle which commences when the measured pH attains a value of 6.6 and terminates when the measured pH is reduced to a value of 6.4.

In a practical system the addition of acid is made at the cold well of the cooling tower and pH measurement is taken at some point in the stream of cooling water being recirculated to the tower from the cold well. Most advantageously, the addition of aqueous acid is by gravity feed and is regulated by the use of an acid-resistant orifice plate located in the acid supply line immediately prior to entry to the cold well. It is usually necessary that adequate filtering be provided in the acid supply line prior to the valving utilized to turn the acid supply on and off. In addition, it is highly desirable that the acid be permitted to settle in a settling zone decanting the acid solution from the upper portion of the settling zone through the acid-resistant orifice into the cold well.

I have found it highly desirable to coordinate the addition of polyphosphates with the acid supply by adding an aqueous solution of polyphosphates to the cooling water at a regulated rate of flow in discontinuous but equally spaced intervals of time. Thus, the desired average rate of phosphate addition may be suitably selected by varying the time interval of addition.

Under conditions, such as during periods of slug feed chlorination, it is also necessary to control the lower pH limit of the phosphate-containing cooling water. This is done by the addition of aqueous sodium hydroxide solution or soda ash solution of any desired strength. I have found that such addition may be made by following the prototype of my system for acid addition; that is, the aqueous solution of sodium hydroxide or soda ash is added at a regulated rate to the water stream upstream from the point of pH measurement in a repeated cycle commencing when the measured pH of the water is lowered to a value of 6.0 and ending when the masured pH is raised to a value of 6.3.

In order more fully to explain the process of my invention, and to illustrate an apparatus by which my invention may be practiced, I refer to the drawings which schematically illustrate in Figure 1 an apparatus for carrying out the addition of aqueous acid solution to the cold well of a cooling tower in accordance with the process of my invention.

Figure 2 of the drawings schematically illustrates an apparatus for carrying out the process of my invention, including the addition of polyphosphates and soda ash, to provide an integrated system of simple design permitting practically trouble-free operation and positive control of pH.

Referring to Figure 1, the reference numeral 1 designates the cold well of a cooling tower (not shown) employing polyphosphate corrosion inhibitors in the cooling water system. Cold well 1 is shown in cross-section for convenience while the rest of the figure is shown schematically.

Cooling water from the cooling tower collects in cold well 1 whence it is drawn through intake 2 to pump 3 and delivered to the process unit by line 4. A previously prepared solution of acid is maintained in storage tank 5. The acid solution is delivered to cold well 1 through gravity feed line 6. A filter 7 is placed in line 6 to arrest and collect any suspended matter before it reaches the cold well. An air actuated valve 8 equipped with an acid resistant valve seat, plug and stem is also interposed in line 6 between filter 7 and cold well 1. Line 6 finally leads to iron acid pot 9 which preferably is a vertically positioned closed cylinder mounted to the wall of cold well 1 by bracket 10. Acid pot 9 provides a settling zone for the acid supply and valved line 11 is provided to draw off any rust or other suspended matter which enters the pot through line 6. A short distance from the top of the pot 9 is run a manifold 12 leading to valves 13 which discharge into lines 14 leading to cold well 1 through glass orifice plates 15.

In the drawing two lines 14 and associated orifices are shown, although one will suffice, in order to secure greater flexibility in operation. The orifices are of different capacities for the purpose of providing differently regulated rates of acid discharge to the cold well. Lines 14 are disposed so as to discharge into cold well 1 as far from pump intake 2 as is practical.

On the outlet side, line 4, of pump 3 glass electrode pH meter 16 is operated to measure continuously the pH value of the cooling water discharge from pump 3. The pH meter 16 is operated in conjunction with pH indicator 18 which indicates the measured value of pH by the position of a needle or pen 19. Mercoid switch 20 is mounted on the indicating dial 17 of indicator 18 disposed so that it is tripped to the closed position as needle 19 attains a value of 6.6 and so that it is tripped open when the needle is lowered to a value of 6.4. Mercoid switch 20 is arranged in an electrical circuit schematically indicated as 21 which includes an appropriate power source and a solenoid valve 22 operated so that when energized by the closing of switch 20 it opens to admit compressed air to air actuated valve 8.

In operation the apparatus of Figure 1 provides positive and reliable control of pH in the continuously circulating water stream passing through cooling tower cold well 1 in the following manner:

The water collecting in cooling tower cold well 1 is continuously circulated by pump 3 which draws from cold well 1 through intake 2 and discharges through line 4 to the process unit. The pH indicator needle 19 as it reaches a value of 6.6 trips mercoid switch 20 to the closed position thereby closing circuit 21 and energizing solenoid air valve 22 to the open position permitting air to pass to air actuated valve 8. Valve 8 remains open as long as air continues to pass through it and permits acid from tank 5 to flow by gravity through line 6 and filter 7 to acid pot 9. Manifold 12 decants acid from the upper portion of pot 9, while valve 8 is open, delivering it through whichever of valves 13 is open to lines 14 and through orifice plates 15 and thence to cold well 1.

This state of operation continues until the measured pH value determined by meter 16 and indicated by pH indicator 18 is reduced to a value of 6.4 at which point mercoid switch 20 is tripped to the open position by needle 19 thus de-energizing solenoid air valve 22, shutting off the air supply to valve 8 which closes on the failure of such air supply and thus stops the introduction of acid to cold well.

The cycle of operation is repeated continuously as the pH varies between values of 6.4 and 6.6. The size of orifice plate 15 is such that the rate of acid flow to cold well 1 is sufficiently fast to arrest the maximum expected rate of increase in pH but insufficient to deliver such a large volume of acid to cold well 1 at the minimum expected rate of pH increase in the system that no measurable time interval elapses in the reduction of pH from a value of 6.6 to a value of 6.4.

Referring to Figure 2 it will be noted that substantially identical operation of the cooling tower water system is contemplated insofar as acid addition is concerned. Where I have used the same reference numerals as in Figure 1 it should be understood that substantially identical apparatus is indicated. Figure 2, however, also illustrates a coordinated and integrated system for the control of pH in the cooling water system of a cooling tower employing polyphosphate corrosion inhibitors. It not only provides for addition of acid to control pH but also provides for the addition of polyphosphates and soda ash in accordance with the method of my invention.

An aqueous solution of polyphosphates which is to be utilized in the water system of the cooling tower is kept in storage tank 23. Line 24 is supplied to provide gravity feed of the polyphosphate solution to the cold well 1 of the cooling tower. Air actuated valve 25 interposed in line 24 between polyphosphate storage tank 23 and cold well 1 is utilized to control the addition of the phosphates to the water system. Timing mechanism 26 is adjusted to close electrical circuit 27 including solenoid valve 28 at regular and equally spaced intervals of time. For example, its operation may be adjusted to close the circuit for one minute in every fifteen minutes leaving the circuit 27 open the remaining 14 minutes. Closing circuit 27 energizes solenoid valve 8 and thus admits compressed air to air actuated valve 25 in the same manner that solenoid 22 controls valve 28.

A previously prepared soda ash solution of any desired strength is stored in tank 29 from which line 30 leads to cold well 1. Air actuated valve 31 is interposed in line 30 between storage tank 29 and cold well 1. An additional mercoid switch 32 is mounted on the indicating dial 17 of indicator 18, disposed so that it is tripped to the closed position as needle 19 falls to indicate a value in pH of 6.0 and so that it is tripped open when the needle indicates the higher value of 6.3. Mercoid switch 32 is arranged in an electrical circuit schematically indicated as 33 which includes an appropriate power source and solenoid valve 34 operated so that when energized by the closing of switch 32 it opens to admit compressed air to air actuated valve 31.

In operation, the apparatus of Figure 2 provides positive and reliable control of pH in the continuously circulating water stream passing through cooling tower cold well 1 in a like manner to the operation of the apparatus of Figure 1.

However, the apparatus of Figure 2 also provides regulated quantities of polyphosphates to compensate for loss in the system. As timer 26 closes circuit 27 for repeating and equally spaced intervals of time of selected duration, the energization of solenoid valve 28 caused thereby releases air which actuates air actuated valve 25 and thus provides additional polyphosphate solution to the water system. The duration of such addition is, of course, selected in accordance with the operating conditions of the water system as determined by required amount of bleeding to prevent the accumulation of water borne salts due to evaporation and the like.

Under ordinary conditions, the soda ash system is not required but periodically other operations require the addititon of materials to the water system causing it to become more acid than is compatible with successful use of polyphosphates, such as during periods of slug feed chlorination. Under such circumstances when the pH meter measures a pH value which becomes decreasingly lower, needle 19 of pH indicator 18 causes mercoid switch 32 to be tripped to the closed position as needle 19 indicates a value of 6.0. In the same manner that mercoid switch 20 controls air actuated valve 8, mercoid switch 32 upon being closed causes air actuated valve 31 to open admitting the solution of soda ash to cold well 1.

This state of operation continues until the measured pH value determined by meter 16 and indicated by needle 19 is raised to a value of 6.3 at which point mercoid switch 32 is tripped to the open position by needle 19 thus de-energizing solenoid air valve 34 shutting off the air supply to valve 31 which closes on the failure of such air supply and thus stops the introduction of soda ash to cold well 1.

I claim:

1. A method for control of pH in a continuously circulating stream of water containing polyphosphate corrosion inhibitors by the addition of aqueous acid solution thereto, which comprises continuously measuring the pH value of the circulating water, introducing aqueous acid solution at a regulated rate to the stream of water at a point upstream from the point at which the pH measurement is taken in a repeated cycle commencing when the pH attains a predetermined maximum value on the acid side and terminating when the measured pH is reduced to a predetermined intermediate value, introducing aqueous sodium base solution at a regulated rate to the stream of water at a point upstream from the point at which the pH measurement is taken in a repeated cycle commencing when the measured pH attains a predetermined minimum value less than said intermediate value and terminating when the measured pH is raised to a predetermined value intermediate said maximum and minimum values, and introducing an aqueous solution of polyphosphates to the water stream at equally spaced intervals of time and selected duration.

2. The method of claim 1 in which the sodium base is soda ash.

References Cited in the file of this patent

UNITED STATES PATENTS

| | | |
|---|---|---|
| 1,145,509 | Pike et al. | July 6, 1915 |
| 1,388,613 | Simsohn | Aug. 23, 1921 |
| 1,450,023 | Edelman | Mar. 27, 1923 |
| 1,934,791 | Butzler | Nov. 14, 1933 |
| 1,943,684 | Martin et al. | Jan. 16, 1934 |
| 1,944,803 | Ornstein | Jan. 23, 1934 |
| 1,997,526 | Hall | Apr. 9, 1935 |
| 2,190,060 | Fager | Feb. 13, 1940 |
| 2,232,211 | Cary | Feb. 18, 1941 |
| 2,287,284 | Behrman | June 23, 1942 |
| 2,521,802 | Otto | Sept. 12, 1950 |

OTHER REFERENCES

Corrosion, vol. 6, No. 10, October 1950, pages 331–340.